US012466098B2

(12) United States Patent
Amoros et al.

(10) Patent No.: US 12,466,098 B2
(45) Date of Patent: Nov. 11, 2025

(54) CALIBRATION SYSTEM AND CALIBRATION METHOD FOR A CONVERTING MACHINE

(71) Applicant: BOBST LYON, Bron (FR)

(72) Inventors: Robert Amoros, Villette d'Anthon (FR); Stéphane Charpin, Villeurbanne (FR)

(73) Assignee: BOBST LYON, Bron (FR)

( * ) Notice: Subject to any disclaimer, the term of this patent is extended or adjusted under 35 U.S.C. 154(b) by 327 days.

(21) Appl. No.: 18/248,204

(22) PCT Filed: Oct. 6, 2021

(86) PCT No.: PCT/EP2021/077610
§ 371 (c)(1),
(2) Date: Apr. 6, 2023

(87) PCT Pub. No.: WO2022/074071
PCT Pub. Date: Apr. 14, 2022

(65) Prior Publication Data

US 2023/0373124 A1 Nov. 23, 2023

(30) Foreign Application Priority Data

Oct. 7, 2020 (EP) .................................... 20315427

(51) Int. Cl.
*B26D 5/00* (2006.01)

(52) U.S. Cl.
CPC .................................... *B26D 5/007* (2013.01)

(58) Field of Classification Search
CPC ...................................................... B26D 5/007
See application file for complete search history.

(56) References Cited

U.S. PATENT DOCUMENTS

| | | | | |
|---|---|---|---|---|
| 5,212,647 | A * | 5/1993 | Raney | G06T 3/60 700/192 |
| 2012/0194791 | A1 | 8/2012 | Duss et al. | |
| 2015/0094836 | A1 * | 4/2015 | Rivers | B23Q 17/2233 700/160 |

(Continued)

FOREIGN PATENT DOCUMENTS

| | | |
|---|---|---|
| EP | 0615941 B1 | 11/1997 |
| EP | 3332927 A1 | 6/2018 |

(Continued)

*Primary Examiner* — Sean M Michalski
(74) *Attorney, Agent, or Firm* — Bookoff McAndrews, PLLC

(57) ABSTRACT

The present invention relates to a calibration system (30) and a calibration method for a converting machine (20) provided with a die-cutting tool (18') and at least one transfer unit (25) for transporting a sheet (1) along a travel path in a direction of conveyance (D) through the converting machine. The calibration system comprising a first image sensor (33), a memory (36) and a control unit (34). The calibration system is configured to detect an actual position of an indicia (42) on the sheet (1) and compare with a reference position of the indicia (42) stored in the memory (36). A correction program stored in the memory is executed when at least one of the longitudinal displacement (Δxi) and the lateral displacement (Δyi) of the indicia exceeds a predetermined tolerance threshold (Txi, Tyi).

17 Claims, 7 Drawing Sheets

(56) References Cited

U.S. PATENT DOCUMENTS

| | | | | |
|---|---|---|---|---|
| 2018/0117786 | A1* | 5/2018 | Schuster .................. | B26D 5/02 |
| 2018/0158537 | A1* | 6/2018 | Blaine ..................... | B26F 3/004 |
| 2019/0358843 | A1* | 11/2019 | Hartman ................ | B26D 1/405 |
| 2021/0053373 | A1* | 2/2021 | Mindler ................. | B41J 29/393 |
| 2023/0373124 | A1* | 11/2023 | Amoros ................... | B26D 5/34 |

FOREIGN PATENT DOCUMENTS

| | | | |
|---|---|---|---|
| GB | 2491080 | A | 11/2012 |
| JP | H1177589 | A | 3/1999 |
| JP | 2002273800 | A | 9/2002 |
| JP | 2012116597 | A | 6/2012 |
| JP | 2012158174 | A | 8/2012 |
| JP | 2015066665 | A | 4/2015 |
| JP | 2017080840 | A | 5/2017 |

* cited by examiner

CALIBRATION SYSTEM AND CALIBRATION METHOD FOR A CONVERTING MACHINE

CROSS-REFERENCE TO RELATED APPLICATION(S)

This application is a National Stage Application under 35 U.S.C. § 371 of International Application No. PCT/EP2021/077610, filed Oct. 6, 2021, which claims priority to European Application No. 20315427.3, filed on Oct. 7, 2020, the entireties of which are incorporated herein by reference.

TECHNICAL FIELD OF THE INVENTION

The present invention relates to a converting machine suitable for producing folding boxes or flat-packed boxes. In particular, the invention relates to a calibration system for a converting machine and a method of aligning a printed image inside a converting machine.

BACKGROUND OF THE INVENTION

Folding boxes or flat-packed boxes can be produced in converting machines comprising die-cutters. These types of machines print, crease and cut sheet substrates of cardboard or paperboard. For sheet-fed machines, a sheet substrate is initially entered into a feeder module of the converting machine and then undergoes a series of operations in different workstations. Some types of converting machines are equipped with rotary die-cutters provided with cutting edges for cutting the sheet.

However, instead of printing the sheet substrates in the converting machine, sheets with pre-printed images can sometimes be provided to the feeder module of the converting machine.

There is a need to feed each sheet such that the image arrives at a correct and constant position in relation to the die-cutter. Variations in the position results in that creased and cut lines are not placed at a consistent distance in relation to the printed image and the final boxes will not have the image at the same position.

In prior art converting machines, it is rather the position of the sheet than the position of a printed pattern that is controlled. Such a control is referred to as the register control. The register is an alignment of the sheets in the converting machine and is related to the angular positions of rotary tools in different workstations. Register control systems comprise optical detectors and use a front leading edge of the sheet as reference. This type of system often provides an acceptable accuracy of the cuts in relation to the image when the converting machine itself is effectuating the printing operation.

For converting machines that are fed with pre-printed sheets, the location of the printed pattern on the sheet is unknown for the converting machine, as no printing register detection has been determined by the register control system. This often results in that the print is not placed at a consistent position on the finished boxes.

The register can be set by adjusting different workstations to each other, such as adjusting angular positions of rotary tools like printing cylinders and rotary dies. Document EP0615941 is disclosing an example of such an arrangement.

Document GB2491080 discloses a calibration device where an image is taken from a reference mark and where corrections are directly effectuated on processing tools such to control the location where the tools work on the substrate.

For other types of converting machines, such as described in US2012/0194791, a continuous web substrate is supplied to the converting machine. As described in US2012/0194791, it is common to adjust the timed angular position of rotary tools instead of the position of the web.

Document EP3332927 discloses a device adapted to detect if a reference mark is positioned on the traverse in order to determine the orientation of the sheet.

SUMMARY

In view of the above-mentioned problem, it is an object of the present invention to ensure that the printed image is placed at substantially the same position on all boxes. The object of the invention is solved by a converting machine according to claim 1 and a method according to claim 15.

According to a first aspect of the present invention, there is provided a converting machine comprising a rotary die-cutting tool and a plurality of individually controllable transfer drives, each transfer drive being operationally connected to at least one transfer unit configured to transport a sheet along a travel path in a direction of conveyance through the converting machine, the converting machine further comprising a calibration system comprising:

- an image sensor configured to capture an actual image of an indicia on a sheet passing through the converting machine,
- a memory configured to store an optimal position of a predetermined reference point in the indicia comprising a lateral coordinate and a longitudinal coordinate,
- a control unit configured to receive data from the image sensor and determine a lateral coordinate and a longitudinal coordinate of a detected reference point in the indicia, and calculate a deviation comprising a longitudinal indicia displacement and a lateral indicia displacement from the position of the detected reference point in relation to the position of the predetermined reference point,
- and wherein the control unit is further configured to execute a correction program stored in the memory when at least one of the longitudinal indicia displacement and the lateral indicia displacement exceeds a predetermined tolerance threshold.

The travel path of the converting machine extends in a direction from the feeder module to the rotary die-cutting tool. The longitudinal image displacement is in the direction of transportation of the sheet.

The position of the detected reference point may correspond to the same position as the predetermined reference point in the indicia. Both the detected reference point and the predetermined reference point have the same spatial longitudinal and lateral coordinates in relation to a printed image on the sheet. However, the detected and predefined reference points will not be in the same position in relation to the converting machine and a predefined coordinate system. The predefined coordinate system can be defined by the image sensor.

The tolerance threshold can be a distance and may be defined in millimeters. In an embodiment, the longitudinal tolerance threshold can be set to "0". In such a way, the correction program is set to the highest level of correction, as no longitudinal indicia displacement is acceptable.

The predetermined reference point in the indicia can be a theoretical center of gravity point of a two-dimensional shape of the indicia. The theoretical center of gravity can thus be a centrally located point in the two-dimensional indicia.

The image sensor can be activated by a detection of the front leading edge by an optical detector, separate from or integrated into the image sensor, and preferably located upstream of the image sensor. Alternatively, a trigger signal to activate the image sensor can be provided by the control unit. For instance, the control unit can determine the time of activation by retrieving the sheet position from the feeder module, or calculate the time of activation based on operating parameters from the feeder module and/or a transfer unit.

The image sensor can be an optical sensor, configured to measure light intensity reflected by the indicia.

In an embodiment, the control unit is configured to issue an error signal if a lateral indicia displacement exceeds the lateral tolerance threshold. The error signal may be configured to activate an ejector module to eject the sheet if the lateral indicia displacement exceeds the lateral tolerance threshold.

In an embodiment, the operation of a feeder module is suspended upon the detection of at least one sheet having a lateral indicia displacement exceeding the lateral tolerance threshold.

In an embodiment, the calibration system further comprises a feed sensor configured to detect the position of a front leading edge of the sheet, and the control unit is further configured to calculate a feeding register displacement by comparing the measured position of the front leading edge with an optimal register position.

The control unit may be configured to calculate a feeding register displacement by comparing the measured position of the front leading edge with an optimal register position, and wherein the control unit is further configured to calculate an initial total longitudinal displacement corresponding to the sum of the longitudinal indicia displacement and the feeding register displacement.

In an embodiment, the calibration system comprises a plurality of transfer sensors arranged along the travel path in the direction of conveyance and configured to detect register displacements.

The control unit may be configured to re-calculate the total longitudinal displacement at each transfer sensor by adding the additional register displacement detected by the transfer sensor.

In an embodiment, the operation of the transfer drives is modified if the initial total longitudinal displacement exceeds the longitudinal tolerance threshold, and the longitudinal position of the sheet is corrected by modifying the speed of the transfer drives.

Each transfer drive can be operatively connected to and configured to control the operation of a first transfer unit and a second transfer unit of the converting machine in unison. The calibration system may also comprise a transfer sensor which may be located at the second transfer unit in the direction of conveyance. In such a way, a change of speed in the second transfer unit changes the position of the sheet before the sheet arrives to the closest downstream-located module which may be a flexographic printing unit.

In an embodiment, the control unit is configured to only modify the operation of the transfer drives if the initial total longitudinal displacement is lower than a maximum longitudinal correction limit.

In an embodiment, the correction program is configured to suspend a feeder module if the initial total longitudinal displacement is higher than a maximum longitudinal correction limit, and only reactivate the feeder module when an angular position of the rotary die-cutting tool has been modified.

In an embodiment, a housing of a transfer unit comprises a reference mark, preferably provided as a line and extending in the direction of conveyance of the converting machine, and the reference mark is visually detectable by the image sensor. In an embodiment, the reference mark can be in a first transfer unit.

In an embodiment, the control unit is configured to calculate an initial correction which is the sum of the longitudinal indicia displacement and the feeding register displacement, and wherein the control unit is further configured to calculate a plurality of fractional corrections such that the initial correction is equally distributed over the plurality of transfer units.

The calibration system is preferably connected to a plurality of individually controllable transfer drives, operationally connected to a plurality of transfer units.

In an embodiment, the calibration system comprises a plurality of transfer sensors arranged along the travel path in the direction of conveyance and configured to detect register displacements, and wherein each register displacement detected by a transfer sensor is added to each subsequent fractional correction.

In an embodiment, the memory comprises instructions for the control unit in a first operating mode and in a second operating mode, and wherein the control unit in the first operating mode is configured to disable the image sensor and only provide a correction of each register displacement detected by each transfer sensor and wherein each respective correction is only effectuated in each respective closest downstream-located transfer located between the transfer sensor and the closest downstream-located printing unit, and wherein the control unit in the second operating mode is configured to activate the image sensor and provide a plurality of distributed fractional corrections.

The selection of operating mode may be entered on the user interface. There are no fractional corrections performed in the first operating mode. The control unit in the first operating mode is configured to provide an immediate correction between the register displacement detection and the closest downstream-located printing unit.

In an embodiment, the memory comprises a transitional memory and comprises a plurality of data positions for a plurality of sheets present in the converting machine, and each data position contains positional information on the location of the sheet and the required fractional correction in the longitudinal direction.

According to a second aspect of the present invention, there is provided a method of calibrating a converting machine (20), the method comprising the steps of:

A) transporting a sheet along a direction of conveyance through the converting machine, B) capturing an actual image of an indicia on said sheet, C) determining a lateral coordinate and a longitudinal coordinate of a detected reference point in the indicia, D) retrieving a lateral coordinate and a longitudinal coordinate of an optimal position of a predetermined reference point from a memory, E) calculating a deviation comprising a longitudinal indicia displacement and a lateral indicia displacement from the position of the detected reference point in relation to the optimal position of the predetermined reference point, F) initiating a correction program when at least one of the longitudinal indicia displacement and the lateral indicia displacement exceeds a predetermined tolerance threshold.

In an embodiment, the operation of the transfer drives is modified if the initial total longitudinal displacement exceeds a longitudinal tolerance threshold, and wherein the position of the sheet is corrected by modifying the speed of the transfer drives.

In an embodiment, the method further comprises a step of selecting a mode of operation between a first operating mode and a second operating mode is performed before the step A), and wherein the method in the first operating mode excludes steps B) to F), and wherein the method instead comprises the steps of:

printing the sheet, detecting register displacements by a plurality of transfer sensors, and correcting each register displacement between each respective transfer sensor and each closest downstream-located printing unit, and wherein the method in the second operating mode only includes all steps A) to F as defined in the method of the previous aspect.

Hence, in the first operating mode, each register displacement is detected with a respective transfer sensor located at a distance upstream of a printing unit and wherein a transfer unit located between the transfer sensor and the printing unit is changing the position of the sheet by acceleration or deceleration of its transportation speed. The image sensor is preferably disabled in the first mode.

BRIEF DESCRIPTION OF THE DRAWINGS

Further advantages and features will become apparent from the following description of exemplary embodiments of the present invention and from the appended figures, in which like features are denoted with the same reference numbers and in which.

DETAILED DESCRIPTION

Figure 1A:
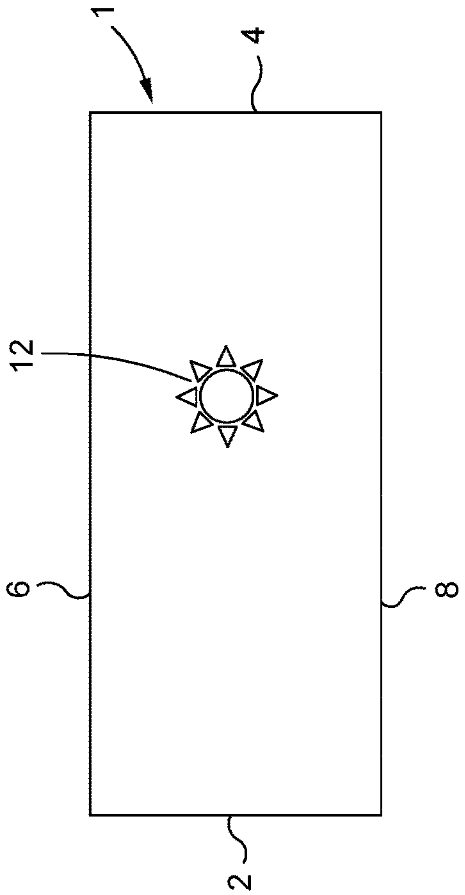
FIGS. 1a, 1b, 1c and 1d show planar and schematic perspective views of a cardboard substrate and a box.
Figure 1B:
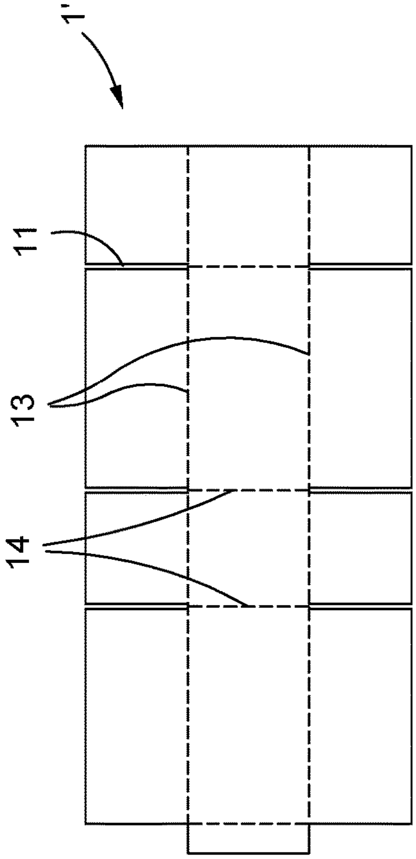
Figure 1C:
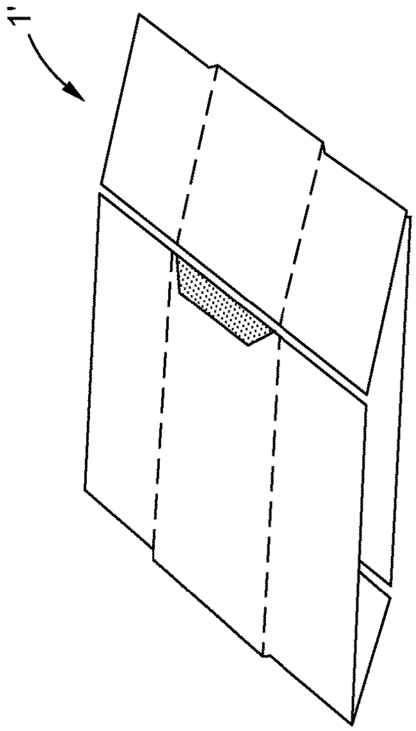
Figure 1D:
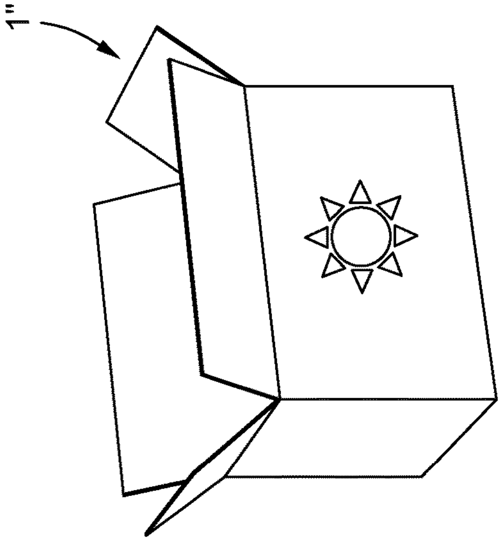

FIG. 1a shows a sheet 1 made of cardboard or paperboard and which is used for manufacturing a box 1'', such as the one shown in FIG. 1d. As illustrated in FIG. 1a, the sheet 1 has a front edge 6, a back edge 8, a first side edge 2 and a second side edge 4. The sheet 1 also comprises a printed pattern or image 12.

Before the box 1'' is assembled to a three-dimensional shape and provided with a content, it is typically provided as an intermediate blank 1' such as a flat-packed box 1' illustrated in FIG. 1b or a folding box 1' illustrated in FIG. 1c. A flat-packed box 1' is a cut and creased sheet 1, which is provided as a single layer. A folding box 1' is a flattened box which has been further folded and glued in a converting machine.

In order to create a flat-packed box 1' or a folding box 1', the sheet 1 undergoes a series of processing operations in a converting machine and in which the sheet 1 is cut and creased to form the intermediate blank 1'.

FIG. 1b illustrates an example of an intermediate blank 1' obtainable from a converting machine 20 according to the present invention. The intermediate blank 1' is typically provided with a first group of creasing lines 13 and a second group of creasing lines 14, transverse to the first group of creasing lines 13. These creasing lines 13, 14 can also be referred to as "folding lines" and enable the sheet 1 to be folded into a three-dimensional box 1''. The intermediate blank 1' is also provided with cuts 11 which form the flaps of the box 1''.

Figure 2:
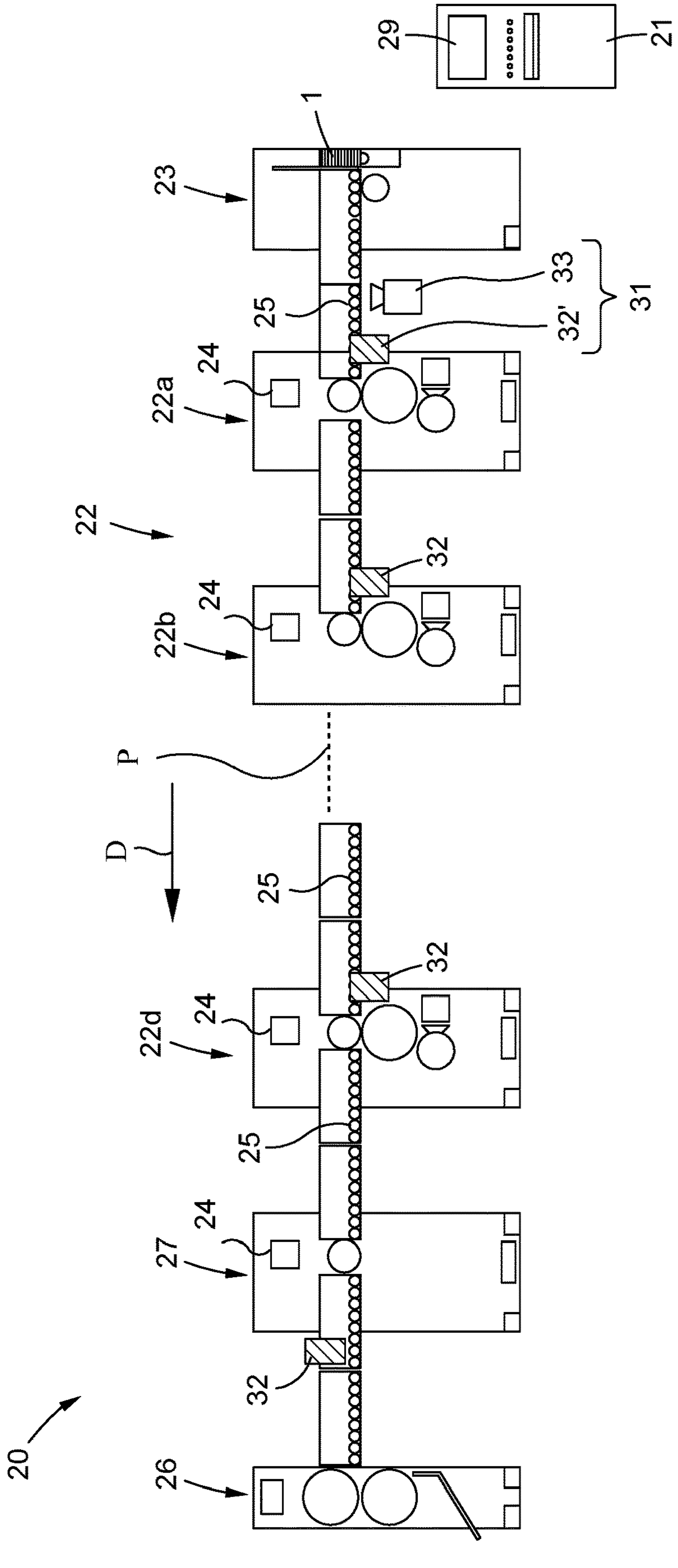
FIG. 2 shows a schematic cross-sectional view of a rotary die-cutting machine according to the present invention.

Now referring to FIG. 2, which illustrates a converting machine 20 according to the present invention and configured to produce the intermediate blank 1' of FIG. 1b. As seen in the figure, the converting machine 20 comprises a series of workstations in the form of a feeder module 23, a flexographic printing module 22 comprising one or several flexographic printing units 22a, 22b, 22c, 22d, and a rotary die-cutting module 26. The converting machine 20 may further comprise optional modules 27 such as a dryer module or an ejector module.

Figure 4:
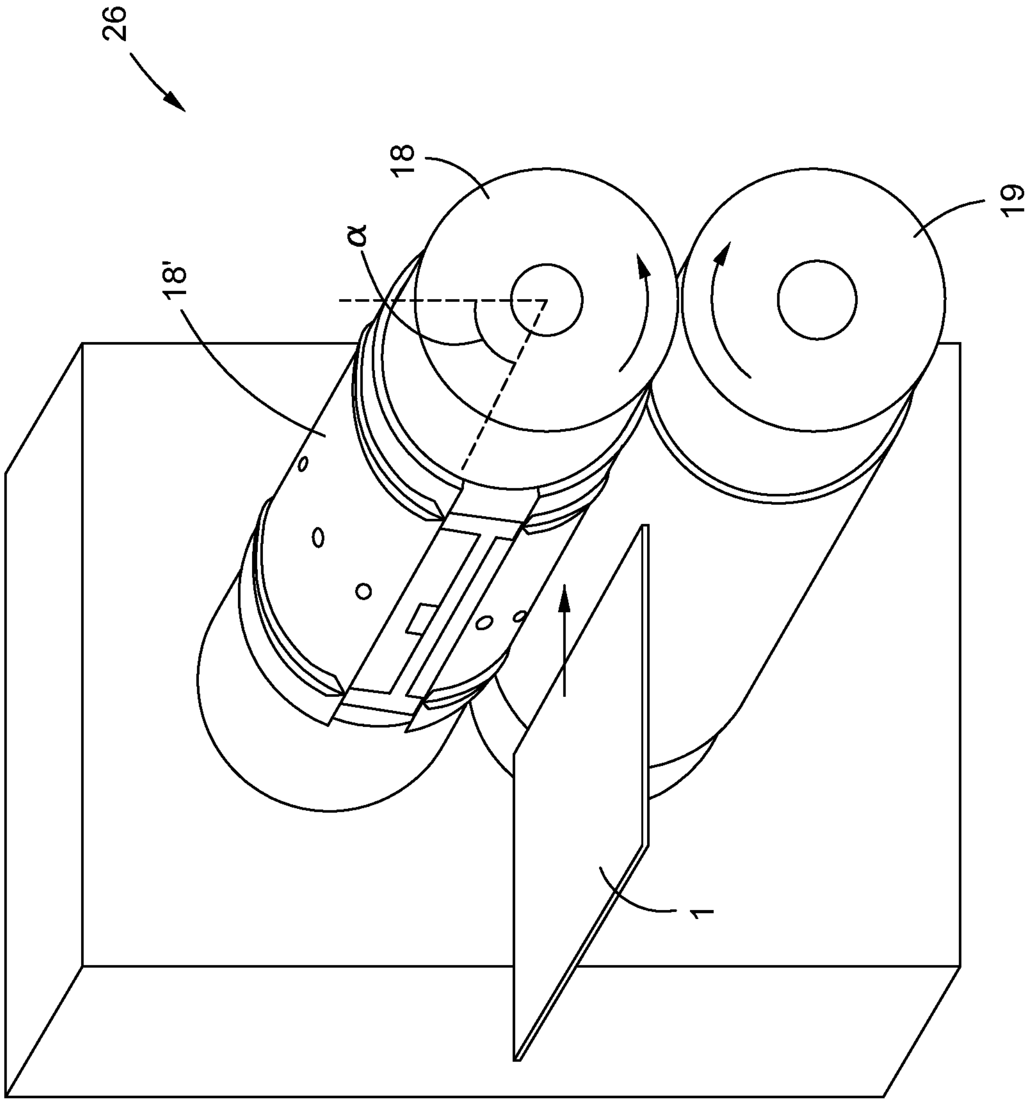
FIG. 4 shows a schematic perspective view of an exemplary rotary die-cutter arrangement.

As illustrated in FIG. 4, the rotary die-cutting module 26 comprises a die-cutting cylinder 18 and an anvil 19 adapted to receive the sheet 1 in a clearance therebetween. The rotary die-cutting module 26 is configured to cut and optionally crease the sheet 1.

The converting machine 20 further comprises a main control unit (ECU) 21 configured to control the overall operation of the converting machine 20 and an operator interface or display 29 configured to display operational data and to receive operator input.

The feeder module 23 is configured to receive a stack of cardboard sheets 1 and feed them one by one along a travel path P, extending in a direction of conveyance D towards the rotary die-cutting module 26. The sheet 1 may be blank (i.e. without print) or provided with a pre-printed pattern 12.

The flexographic printing module 22 is arranged after the feeder module 23, and comprises at least one flexographic printing unit 22a. Typically, a plurality of flexographic printing units 22a, 22b, 22c, 22d are provided in order to enable a printing process with different-colored inks.

The sheet 1 is provided with a pre-printed image 12, for instance an ornament, a pattern, a brand or a company name related to the content planned for storage inside the final box 1''. The flexographic printing module 22 may be configured in a default position to print the sheets 1. However, if the sheet 1 is already pre-printed when placed in the feeder module 23, the flexographic printing units 22a, 22b, 22c, 22d in the converting machine 20 may be disabled such that their printing cylinders are idle and not in contact with the sheet 1. This can for instance be done by deactivating and spacing the printing roll and the counter cylinder apart. In such a way, the sheet 1 can pass without contacting the printing cylinders.

In the case when the converting machine 20 is both printing the image 12 and cutting the sheet 1, there are typically less errors. This is due to the control system of the converting machine 20 being capable of detecting and aligning the printing and cutting operations. The alignment between the printing and cutting operations and the related settings can also be modified by the operator. Consequently, in that case, it may be easier to adjust a rotary cutting tool in relation to a printed image produced by a flexographic printing module 22 in the same machine and to ensure that the position of the printed image 12 is aligned in relation to the rotary die-cutting tool.

There are variations in the dimensions of the sheets 1 introduced into the feeder module 23, and the sheet edges 2, 4; 6, 8 are not necessarily perpendicular in relation to each other. These variations stem from the process of cutting cardboard or paperboard sheet 1. In a standard process of producing cardboard sheet 1 in a corrugator machine, an external pre-printed layer joins as an external layer to form part of the cardboard. Thereafter, the continuous web is cut into separate sheets 1 in the corrugator machine. As a result, there are deviations in the distance from the cut edges to the printed image, and an image 12 on a first sheet 1 is not necessarily located at the same position as on a following sheet 1. Oftentimes, a sheet 1 obtained in a corrugator machine has a lengthwise deviation of up to 4 mm or more.

In prior art converting machines, the position in which a rotary die-cutting tool should strike the sheet is defined by the position of the front leading edge of the sheet and is corrected (if needed) by a transfer drive of the converting machine. This is the typical method of correcting the register. The register is an alignment of the sheets in the converting machine and is related to the angular positions of the tools in different workstations (e.g. a rotary die-cutting tool) of the converting machine.

The register can be set by adjusting different workstations to each other, such as adjusting angular positions of rotary tools (printing cylinders and rotary die-cutting cylinders etc.). The register can be "correct/on register", or there can be a register displacement error, which means a misalignment of the different operations.

Converting machines with rotary die-cutting modules operate at high speeds and sometimes about 15 sheets are in movement inside the converting machine at the same time. In comparison, platen-press die cutting machines only have one sheet at a time in movement inside. Consequently, the speed and the number of sheets inside a rotary die-cutting converting machine makes it difficult to correct for register displacement errors for each individual sheet.

Figure 3:
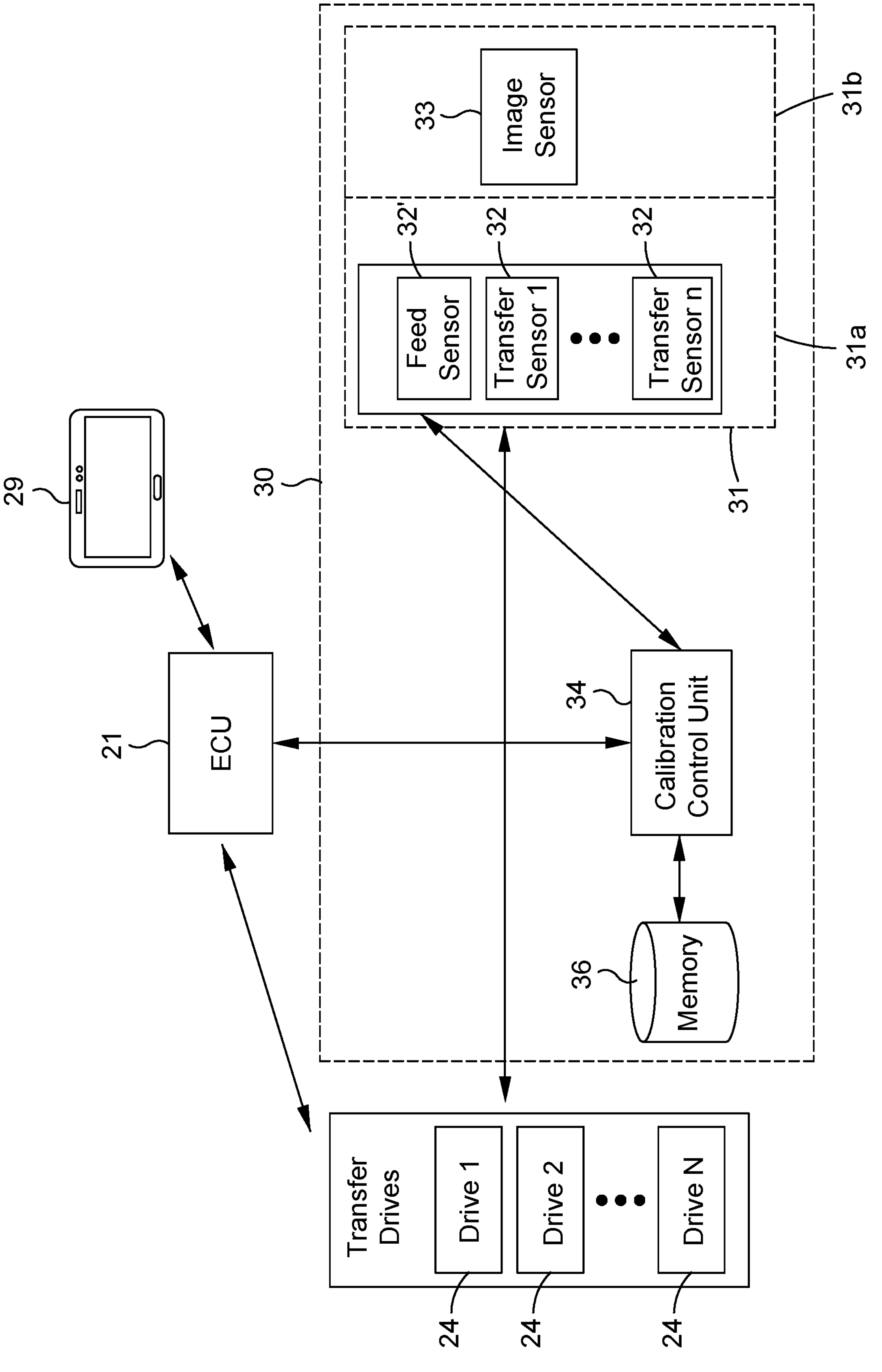
FIG. 3 is a schematic diagram of a calibration system according to the present invention.

As illustrated in FIGS. 2 and 3, the converting machine 20 of the present invention is provided with a calibration system 30. The calibration system 30 is configured to detect the position of the printed image 12 on each sheet 1 and enable the converting machine 20 to correct the position of each sheet 1 such that the image 12 on each sheet 1 arrives at a constant position in relation to a rotary die-cutting tool 18'. Hence, the present calibration system 30 is configured to detect the position of a pre-printed image 12, which is present on the sheet 1 already in the feeder module 26 of the converting machine 20.

As best seen in FIG. 3, the calibration system 30 comprises an optical sensing arrangement 31, a calibration control unit or control unit 34 and a memory 36 containing at least one correction program with instructions to modify the operation of the converting machine 20. The optical sensing arrangement 31 comprises a register detection system 31*a* and an image detection system 31*b*.

Figure 5:
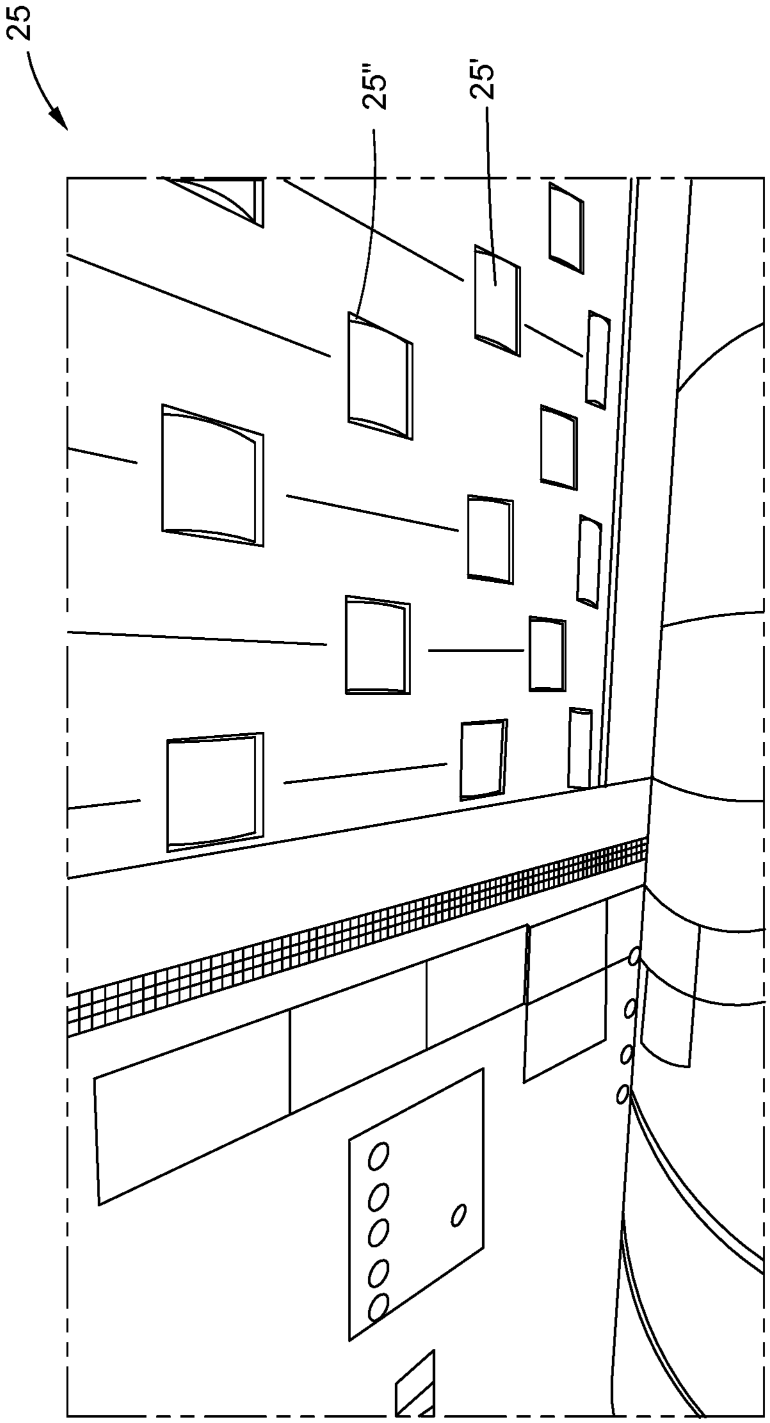
FIG. 5 illustrates an exemplary view of a transfer unit in accordance with the present invention.

As best seen in FIGS. 2 and 5, the converting machine 20 has a conveyance system comprising a plurality of individually controllable transfer drives 24 which are each operationally connected to transfers units 25 comprising drive elements 25', such as rollers 25' or belts. The drive elements 25' transport the sheet 1 forwards along travel path P in a direction of conveyance D through the converting machine 20. Vacuum suction apertures 25" are located around the rollers 25' and are arranged to hold the sheet firmly against the drive rollers 25'.

The transfer units 25 are controllable transportation segments which transport the sheet 1 in a controlled manner between different workstations, such as between the feeder module 23, the flexographic printing units 22*a*, 22*b*, 22*c*, 22*d* and to the rotary die-cutting module 26. By adjusting the speed of the drive rollers 25', the transfer units 25 can correct for displacement errors in the longitudinal direction, i.e. in the main direction of conveyance D.

Converting machines in general are used to produce a series of work-batches with varying types of boxes 1" in terms of dimensions and printed images 12. For a new work-batch, the rotary die-cutting tool 18' needs to be changed if the box dimensions and configuration change. For each separate work-batch, job specifications are provided that define the positions of the creased lines 13, 14 and cut lines 11 in relation to the image or pattern 12. The specifications include theoretical distances which are defined from edges 2, 4; 6, 8 of an ideal rectilinear sheet, but are typically not defined in relation to the edges of the actual sheet 1. Hence, if the image 12 is not placed at a consistent distance from the edges 2, 4; 6, 8 of the sheet 1, the image 12 will not be placed at a consistent position on the finished flat-packed or folded box 1' either.

Upon receipt of job specifications, the operator first configures the converting machine 20 by changing the rotary die-cutting tool of the 18' die-cutting cylinder 18, then adjusts the lateral position of the sheets 1 in the feeder module 23 and sets the longitudinal register.

Figure 6:
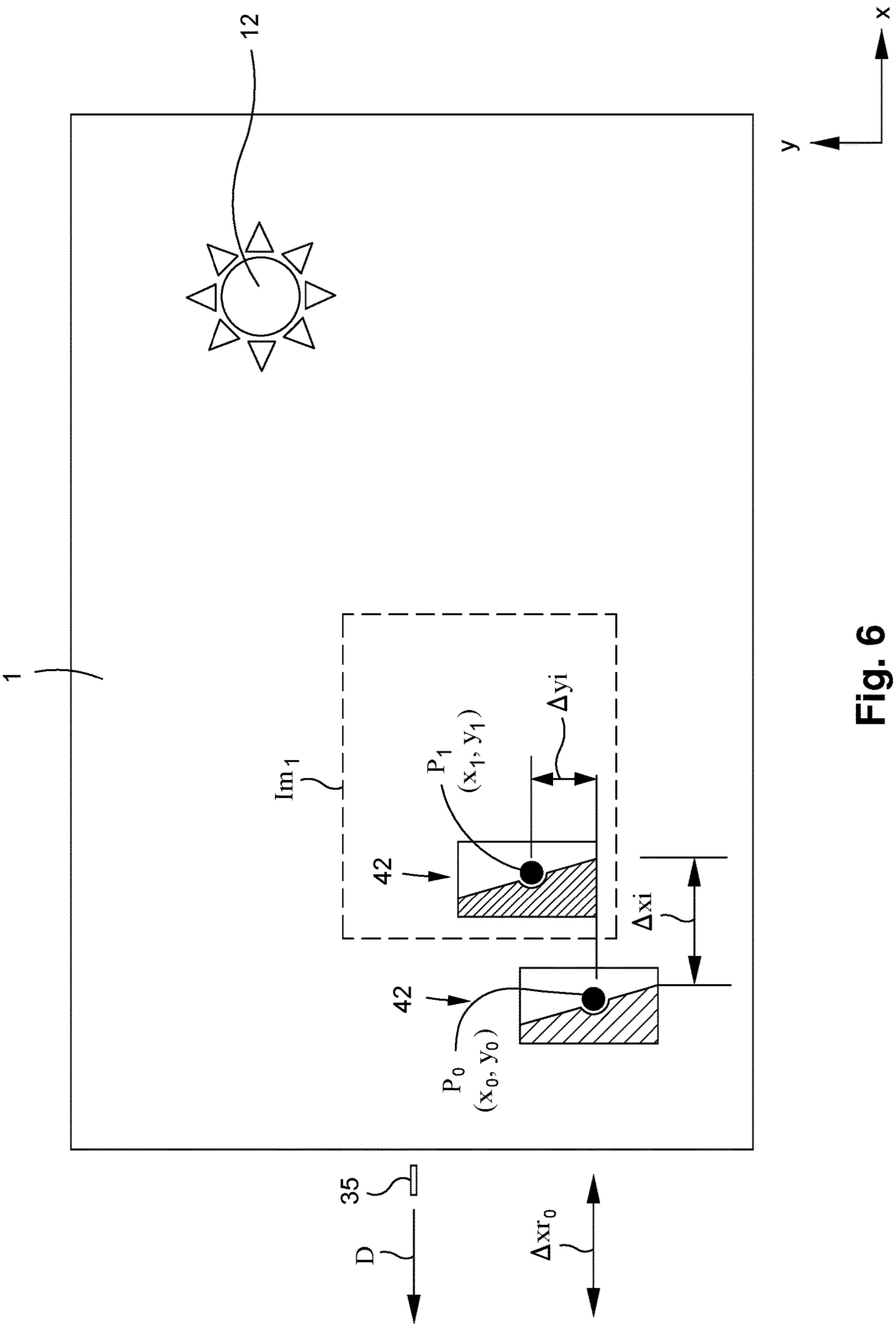
FIG. 6 shows a schematic diagram of displacements captured by the present calibration system.
Figure 7B:
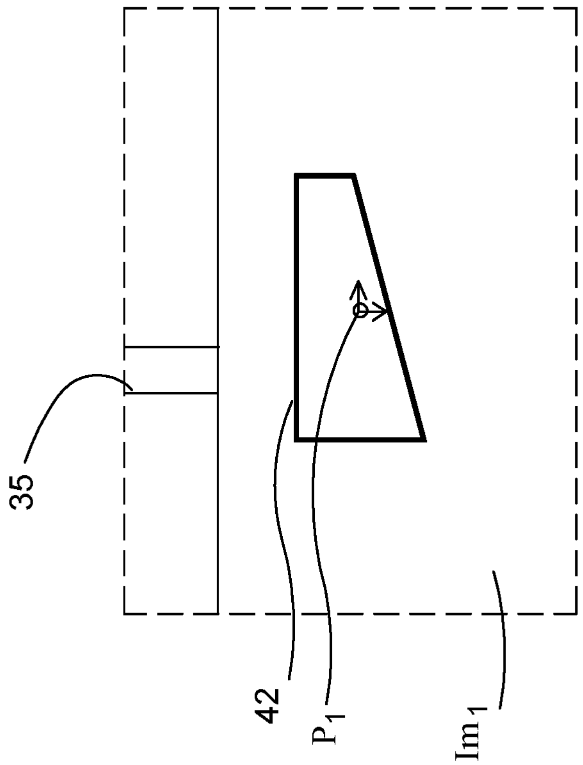
FIGS. 7a and 7b show schematic views of an image capture of the present calibration system.
Figure 7A:
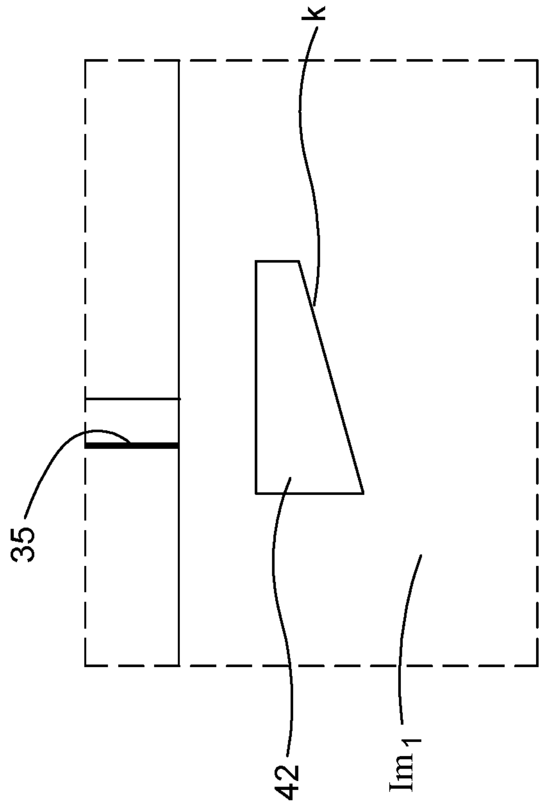

As best seen in FIGS. 6, 7*a* and 7*b*, the present optical sensing arrangement 31 is configured to determine a lateral image displacement Δyi and a longitudinal image displacement Δxi of the image 12 on the sheet 1*b* y detecting a displacement in lateral direction y and longitudinal direction x of an indicia 42 on the sheet 1. The lateral direction y and the longitudinal direction x are perpendicular to each other, and the longitudinal direction x coincides with the direction of conveyance D of the sheets 1.

The indicia 42 is a reference mark provided at a position having a predefined spatial link to the printed image 12. In other words, the indicia 42 is placed at a predefined distance from the image 12 in the lateral direction y and the longitudinal direction x. Hence, the indicia 42 is placed at predetermined coordinates from the printed image 12. For pre-printed sheets 1, the indicia 42 is already provided on the sheet 1, and preferably the indicia 42 is printed together and at the same time as the image 12. This ensures a fixed spatial correlation between the indicia 42 and the image 12. Consequently, the determined lateral Δyi and longitudinal indicia displacement Δxi of the indicia 42 is equal to the lateral Δyi and longitudinal displacement Δxi of the printed image 12.

The indicia 42 is preferably placed in the margins of the sheet 1 and outside the ornamental pattern of the image 12. The indicia 42 can advantageously be positioned outside the peripheral lines of the box on the sheet 1, such that it can be cut away as debris by the rotary die-cutting module 26. The indicia 42 is preferably placed close to the front leading edge 6 of the sheet 1.

The total longitudinal displacement Δx of the indicia 42 coincides with the direction of conveyance D of the sheet 1 through the converting machine 20. Initially, the total longitudinal displacement Δx is dependent on an initial feeding register displacement $\Delta xr_0$ in the feeder module 23 and the longitudinal indicia displacement Δxi of the indicia 42 in relation to the front leading edge 6 of the sheet 1. However, the longitudinal indicia displacement Δxi of the image 12 on the same sheet 1 is constant. However, as previously described, the longitudinal indicia displacement Δxi varies between the different sheets 1.

The initial total longitudinal displacement $\Delta x_0$ of the indicia 42 in the feeder module 23 can thus be expressed as:

$$\Delta x_0 = \Delta xi + \Delta xr_0$$

The total longitudinal displacement Δx then varies as the sheet 1 is transported along the path P in the direction of conveyance D. Consequently, each time the position of the front leading edge 6 is detected by a transfer sensor 32, a subsequent total longitudinal displacement $\Delta x_n$ can be obtained at each transfer sensor n. This detected error is different in each transfer sensor 32. This can be expressed in the following relationship:

$$\Delta x_n = \Delta x_0 + \Delta xr_n$$

Consequently, the total longitudinal displacement $\Delta x_n$ at transfer sensor 32 number n is the sum of the detected register displacement $\Delta xr_n$ and the initial total longitudinal displacement $\Delta x_0$.

The lateral displacement Δy of the printed image 12 is an error that is mostly inherent to variations of the printed image 12 in relation to the lateral sides 2,4 of the pre-printed sheet 1.

The lateral displacement Δy can also originate from side-guides in the converting machine 20 that are not properly set, but this is typically corrected by the machine operator. Hence, it is mostly a static error and not necessarily a dynamic error depending on register displacement errors. When the lateral displacement Δy of the printed image 12 is only caused by displacement of the printed image 12 on the sheet 1, the following relationship applies:

$$\Delta y = \Delta yi$$

As seen in FIGS. 2 and 3, the optical sensing arrangement 31 comprises a register detection system **31*a* and an image detection system 31*b*. The image detection system 31*b* comprises an image detection sensor 33 (also referred to as image sensor herein) configured to capture an actual image $Im_1$ of an indicia 42 on the sheet 1 passing through the converting machine 20. The register detection system 31*a* comprises a feed sensor 32' and a series of downstream-located transfer sensors 32**.

The information from the sensors 32', 32, 33 is integrated in order to continuously determine the total longitudinal displacement Δx and the lateral displacement Δy of the indicia 42. Hence, the present optical sensing arrangement 31 is configured to both detect printing misalignments of the printed image 12 on the sheet 1 and register displacements of the sheet 1 inside the converting machine 20. By the integration of these optical detection systems **31*a*, 31*b*, the position of the indicia 42 is continuously determinable as the sheet 1 passes through the different workstations in the converting machine 20**.

The image detection sensor 33 may be an optical sensor 33, such as a camera sensor 33. The image detection sensor 33 is configured to capture an actual image $Im_1$ of the indicia 42. The image detection sensor 33 is placed at a fixed position (i.e. in a reference position), and preferably at the end of a feeder transfer unit 25. This enables an early detection of the indicia displacement Δxi, Δyi. Consequently, a correction can be applied in the downstream-located transfer units 25. This will be explained in more detail further below. Optionally, the image detection sensor 33 is mounted on a guide rail and can be displaced in order to be aligned with the indicia 42. This is advantageous when the position of the indicia 42 changes significantly, for example between different sheet formats.

As best seen in FIG. 6, the image detection sensor 33 is configured to take a picture $Im_1$ of a part of the sheet 1 where the indicia 42 is located. Both a lateral coordinate y1 and a longitudinal coordinate x1 of a detected reference point $P_1$ in the indicia 42 can be determined from the image $Im_1$ by the control unit 34, which is configured to receive data from the image sensor 33. The control unit 34 may determine the lateral coordinate y1 and a longitudinal coordinate x1 of the detected reference point $P_1$ in the indicia 42 with an image recognition program stored in the memory 36.

The memory 36 is further configured to store an optimal position of a predetermined reference point $P_0$ in the indicia 42. The optimal position of the predetermined reference point $P_0$ comprises a lateral coordinate y0 and a longitudinal coordinate x0. The reference points $P_0$ and $P_1$ are geometrically located in the same position in the indicia 42, but will have different spatial coordinates. The optimal position of the predetermined reference point $P_0$ can be determined from a reference image $Im_0$. The reference image $Im_0$ can be obtained by a machine learning process. For instance, a first sheet 1 provided with an indicia 42 is typically entered in the converting machine 20. The image detection sensor 33 is activated and captures an image $Im_0$ of the indicia 42. The control unit 34 thereafter calculates an optimal position of the reference point $P_0$ in the indicia 42 comprising a lateral coordinate y0 and a longitudinal coordinate x0 and enters the coordinates into the memory 36. The coordinates can be defined by a coordinate system of the image detection sensor 33. The angular position α of the rotary die cutting tool 18' can then be selected based on the optimal position of the predetermined reference point $P_0$. The reference image $Im_0$ can be reset for different work-batches or when job specifications change. Hence, the converting machine 20 is calibrated based on the reference image $Im_0$ and the optimal position of the predetermined reference point $P_0$.

An optical sensor (not shown) may be used to detect the passage of the front leading edge 6 in order to activate the image detection sensor 33. Alternatively, a trigger signal to activate the image detection sensor 33 can be provided by the control unit 34. For instance, the control unit 34 can determine the time of activation by retrieving the sheet position from the feeder module 23, or by calculating the time of activation based on operating parameters from the feeder module 23 and/or a transfer unit 25.

By image processing, a deviation comprising the longitudinal indicia displacement Δxi and the lateral indicia displacement Δyi of the indicia 42 on the captured image $Im_1$ can be determined by the control unit 34 when comparing with the coordinates x1, y1 of the detected reference point $P_1$ with coordinates x0, y0 of the predetermined reference point $P_0$. The camera sensor 33 provides an advantage in the sense that no specific geometry of the indicia 42 is needed as the system works by comparing coordinates x1, y1 of an actual reference point $P_1$ in an image $Im_1$ with predefined reference longitudinal x0 and lateral coordinates y0 of the reference position $P_0$. Hence, the following relationships apply:

$$\Delta xi = x1 - x0$$

$$\Delta yi = y1 - y0$$

Optionally, as schematically illustrated in FIG. 6, a reference mark 35 can be provided in an exterior housing of the feeder transfer unit 25 and located in the vision field of the image detection sensor 33. The feeder transfer unit 25 is thus configured to hold the sheet 1 firmly and while the reference mark 35 and the image $Im_1$ are captured by the image detection sensor 33.

The reference mark 35 can be provided as a line extending in the longitudinal direction (i.e. the direction of conveyance D). The reference line 35 provides a physical and fixed reference for the captured image $Im_1$. If there is a displacement of the captured image $Im_1$ due to a camera movement, the reference mark 35 provides additional physical reference information in order to detect and correct for the camera capture/reading error. For instance, the camera may cause a capture error if it is displaced by vibration.

As illustrated in FIGS. 7*a* and 7*b*, the detected reference point $P_1$ and the predetermined reference point $P_0$ in the indicia 42 can be a theoretical center of gravity point of the shape. The theoretical center of gravity can thus be a centrally located point in the two-dimensional indicia 42.

The actual position of the indicia 42 varies between different sheets 1. The control unit 34 is configured to calculate the longitudinal indicia displacement Δxi and the lateral indicia displacement Δyi between the actual position x1, y1 coordinates of the detected reference point $P_1$ and the predetermined coordinates x0, y0 of the predetermined reference point $P_0$ for each sheet 1.

Alternatively, instead of a camera sensor 33, a photodetector 33 can be used. Such a photodetector 33 is configured to detect differences in captured light. The photodetector 33 can emit a light signal and capture the return signal. To enable the optical sensing arrangement 31 to measure the displacement in the lateral direction y and the longitudinal direction x, the sheet 1 may be provided with a two-dimensional optically readable indicia 42.

To enable the photodetector to determine the lateral displacement Δy and the longitudinal displacement Δx, the indicia 42 may comprise a body with a non-uniform shape having a varying longitudinal extension. Hence, the thickness of the indicia 42 varies if the sheet 1 is shifted in the lateral direction. The thickness of the indicia 42 is detectable by the photodetector 33 and thus indicative of the lateral position of the sheet 1.

The indicia 42 can be provided with a sloped trailing edge in the direction of conveyance D. The trailing edge may have a constant slope k, which provides a functional relationship between the measured position in the indicia 42 and the lateral and longitudinal displacements.

As best seen in FIGS. 2 and 6, the register detection system 31*a* comprises a feed sensor 32', which is preferably an optical sensor and configured to detect the front leading edge 6 of the sheet 1. Advantageously, the feed sensor 32' is placed at a transfer unit 25 in proximity with the image detection sensor 33. In this way, the position of the indicia 42 and the position of the front leading edge 6 are detected to determine the initial total longitudinal displacement $\Delta x_0$ (which includes the feeding register displacement $\Delta xr_0$ from the feeder module 23). The feed sensor 32' can be placed directly after the feeder module 23, for instance between the feeder module 23 and the first flexographic unit 22*a*.

However, registration errors in terms of undesired registration displacements Δxr are frequent and depend not only on the initial settings on the converting machine 20, but also on any movement of the sheet 1 as it travels through the converting machine 20. Hence, the registration displacement $\Delta xr_n$ is re-evaluated by each of the transfer sensors 32. The registration displacement $\Delta xr_n$ can thus be re-assessed for each detection from the transfer sensors 32.

Hence, the re-evaluated (i.e. re-calculated) total longitudinal displacement $\Delta x_n$ in a detection position n, can be expressed as:

$$\Delta x_n = (\Delta xr_0 + \Delta xi) + \Delta xr_n$$

The detection position is the location of a transfer sensor 32. Therefore, it is advantageous to provide the register detection system 31*a* with a plurality n of transfer sensors 32 configured to detect the front leading edge 6 of the sheet 1 at multiple locations. After the feed sensor 32', a plurality of transfer sensors 32 are located downstream through the converting machine 20 in proximity with the transfer units 25 and are configured to detect the passage of the front leading edge 6 in the transfer units 25.

The feed sensor 32' may be located inside or after the feeder module 23. The feed sensor 32' is preferably an optical detector, such as or photodetector (e.g. a high speed cell) and is configured to detect the passage of the front leading edge 6. The feed sensor 32' can be of the same type as the transfer sensors 32.

The feeder module 23 may advantageously comprise a general counter. The general counter may be included in the main control unit 21, or in a transfer drive 24 directly connected to the feeder module 23. The general counter is configured to calculate theoretical transfer speeds and determine which sheet 1 (among the plurality of sheets inside the machine at the same time) is detected each time a transfer sensor 32 detects a front leading edge 6.

The memory 36 preferably comprises a tolerance threshold value Tyi in terms of an acceptable lateral displacement Δyi of the indicia 42. In this way, a tolerable displacement distance can be set for which the quality of the box 1" will still be acceptable. The threshold value Tyi thus defines a tolerable lateral displacement Δyi for which no correction is needed.

The tolerance threshold value Tyi can be selected on the operator interface 29 by the operator. The level of accuracy required may vary depending on the type of boxes produced. Typically, for high-end packaging, the required accuracy is higher than for some more basic boxes.

The threshold tolerance value Tyi can be set, for instance with an accuracy of 0.1 mm. If the actual indicia displacement Δy is larger than the tolerance threshold value Tyi, the sheet 1 can be tagged in the memory 36 to be discarded or ejected. Optionally, the correction program may be disabled for the particular sheet 1. In another embodiment, the calibration system 30 may automatically suspend the feeder module 23 of the converting machine 20.

The initial total longitudinal displacement $\Delta x_0$ may also be provided with a threshold value Txi. In some cases, the initial total longitudinal displacement $\Delta x_0$ may exceed a maximum longitudinal correction limit Tx_max for which the transfer drives 24 are able to correct. If the detected total longitudinal displacement $\Delta x_0$ exceeds the longitudinal maximum longitudinal correction limit Tx_max, the calibration system 30 may automatically suspend the feeding of the machine 20.

When the feeding is suspended (and when the machine is empty), a register correction can be applied on the rotary die-cutting module 26. By modifying the angular position α of the rotary die-cutting tool 18', the cutting edges of the rotary die-cutting tool 18' can be aligned with the image 12. Hence, by modifying the angular position α, larger correction distances in the longitudinal direction x can be achieved. The feeding may restart automatically when the control unit 34 has entered the modified register settings into the memory 36. Hence, the calibration system 30 may automatically suspend the feeding, modify the angle α of the rotary die-cutting cylinder 18 and resume the feeding.

The control unit 34 is further configured to execute a correction program stored in the memory 36 when at least one of the longitudinal indicia displacement Δxi and the lateral indicia displacement Δyi exceeds a predetermined tolerance threshold Txi, Tyi. The program contains instructions for the transfer drives 24 such the speed of at least one transfer unit 25 can be modified. Preferably, the speed of a plurality of transfer units 25 is modified. The correction program may be initiated by the control unit 34 if the initial longitudinal displacement $\Delta x_0$ is larger than the longitudinal tolerance threshold Txi and inferior to the maximum correction value Tx_max. The longitudinal tolerance threshold Txi may be set to "0", such that the correction program is set to the highest level of correction.

As there is a plurality of sheets 1 present in the converting machine 20 at the same time, each sheet 1 is individually analysed in terms of the longitudinal Δxi and lateral displacement Δyi of the indicia 42. Consequently, each transfer drive 24 is configured to apply different speeds by providing accelerations and decelerations to each sheet 1. The control unit 34 is also configured to determine which transfer unit 25 each respective sheet 1 is in contact with at a given point in time. This is needed in order to be able to provide an adapted displacement correction for each sheet 1, and which displacement correction is based on the specific displacement error Δx of each sheet 1.

The calibration system 30 is configured to correct for both the longitudinal indicia displacement Δxi and the register displacement Δxr. Therefore an initial correction $\Delta c_0$ is provided by the calibration system 30 and equals the sum of the longitudinal indicia displacement Δxi and the feeding register displacement $\Delta xr_0$. This can be expressed in the following relationship:

$$\Delta c_0 = \Delta xi + \Delta xr_0$$

equals $$\Delta c_0 = \Delta x_0$$

Due to the high speeds of the sheet 1, which can be around 5 to 6 m/s, it can be difficult to correct for large displacement errors in one single step.

As the converting machine 20 comprises a series of independently controllable transfer drives 24, a series of sequential longitudinal corrections can be effectuated by the transfer units 25 from the transfers 25 located immediately before the first **22*a* or second flexographic printing unit 22*b* and all the way to the rotary die-cutting module 26. This allows for a distributed correction of every sheet 1 such that the transportation of the sheet 1 through the converting machine 20 is uniform and abrupt accelerations and decelerations can be avoided. This allows for a smooth transportation of the sheet 1 throughout the converting machine 20**.

To this effect, the calibration system 30 may calculate a fractional correction Δcf for each transfer drive 24 by dividing the initial total longitudinal displacement $\Delta x_0$ by the number N of transfer drives 24 capable of effectuating the correction. This can be expressed in the following relationship:

$$\Delta cf = \frac{\Delta xi + \Delta xr0}{N}$$

Hence, an initial feeder registration displacement $\Delta xr_0$ value can be added to the indicia displacement Δxi. This is advantageous as the largest displacements in terms of the combination of indicia displacement Δxi and register displacement Δxr often occur at the feeder module 23.

As there are continuous register displacements Δxr throughout the converting machine 20, each transfer sensor 32 can be configured to calculate a register displacement $\Delta xr_n$. The new register displacement $\Delta xr_n$ is preferably added to the fractional correction Δcf, and can be applied to the closest downstream-located transfer unit 25. The actual correction applied to each transfer drive 24 can then accommodate for changes in the register positions which occur along the travel path P. This can be expressed in the relationships:

$$\Delta cf_1 = \Delta cf + \Delta xr_1$$

$$\Delta cf_n = \Delta cf + \Delta xr_n$$

The detection of the front leading edge 6 can be sent to the transfer drive 24 which manages the speed of the transfer unit 25 in contact with the sheet 1. Alternatively, the same correction can be effectuated in two transfer units 25 if they are configured as operationally and mechanically connected segments. The control unit 34 calculates the acceleration or deceleration of the transfer drive 24 required for effectuating the required correction $\Delta cf_n$ to the sheet 1.

The speed for at least one, preferably a plurality of transfer drive 24 is modified in order to correct the longitudinal position of the indicia 42.

The presence of each sheet 1 can be determined with the register detection system **31*a*. As previously described, the register detection system 31*a* can together with the general counter determine which transfer unit 25 is in contact with which sheet 1. This enables the calibration system 30 to apply a specific correction to each sheet 1**.

The inventors have further found that the calibration system 30 may be provided with a first operating mode and a second operating mode. The selection of operating mode may be entered on the operator interface 29.

The first operating mode may preferably correspond to a default operating mode, in which the flexographic printing module 22 of the converting machine 20 is activated and is configured to print the sheet 1. In the first operating mode, each register displacement error Δxr detected by each transfer sensor 32 (and optionally also by the feed sensor 32') is corrected in its entirety (or to a maximum) in each transfer unit 25 located between each respective sensor 32, 32' and the closest downstream-located printing unit. This results in that the printed motifs from the flexographic printing units **22*a* to 22*d*** are aligned with each other.

In the second operating mode, the flexographic printing module 22 is disabled, and the calibration system 30 thus configured to use the full distance through the flexographic printing module 22 as a correction distance. This allows for correction of large longitudinal displacement errors which are typically encountered with pre-printed sheets 1. As previously described, these large longitudinal displacement errors correspond to the initial feeding register displacement Δxr0 and the longitudinal image displacement Δxi. In the second operating mode, the converting machine 20 may be configured to only die-cut the sheet 1.

The memory 36 may also comprise a transitional rewriteable memory 36 including a series of open positions for storing the longitudinal Δxi, lateral displacement Δyi and initial feeder register displacement $\Delta xr_0$ of each sheet 1.

This enables the required fractional correction $\Delta cf_n$ to be updated each time the position of the front leading edge 6 is detected by a transfer sensor 32.

Also a lateral correction is needed when the predetermined tolerance threshold value Tyi is exceeded. The predetermined lateral tolerance threshold value Ty can be set by the operator as previously described. A typical tolerance threshold Tyi can be an error of 0.5-20 mm. When a lateral displacement Δy exceeding the lateral threshold Ty is detected, the sheet 1 may be determined to be ejected by the control unit 34. The feeder module 23 is preferably suspended to avoid processing erroneous sheets 1. The feeding can be suspended such that a lateral correction can be applied to the die-cutting cylinder 18, preferably when the converting machine 20 is empty. The feeder module 23 may automatically resume feeding after this correction.

The calibration control unit 34 is thus configured to determine the lateral image displacement Δyi, the longitudinal image displacement Δxi and the register displacements $\Delta xr_n$ and further communicate calculated corrections to the main control unit 21 in order to control the overall operation of the converting machine 20.

With the present calibration system 30, the image detection system 31*b* only needs to determine one time the longitudinal Δxi and lateral displacements Δyi of the indicia 12 on the sheet 1. Thereafter, the register detection system 31*a* is able to identify the position of the indicia 42 by continuously detecting the passage of the front leading edge 6.

The invention claimed is:

1. A converting machine comprising a rotary die-cutting tool and a plurality of individually controllable transfer drives, each transfer drive being operationally connected to at least one transfer unit configured to transport a sheet along a travel path in a direction of conveyance through the converting machine, the converting machine further comprising a calibration system comprising:

an image sensor configured to capture an actual image of an indicia on a sheet passing through the converting machine, a memory configured to store an optimal position of a predetermined reference point in the indicia comprising a lateral coordinate and a longitudinal coordinate, and a control unit configured to receive data from the image sensor and determine a lateral coordinate and a longitudinal coordinate of a detected reference point in the indicia, and calculate a deviation comprising a longitudinal indicia displacement and a lateral indicia displacement from the position of the detected reference point in relation to the position of the predetermined reference point, wherein the control unit is further configured to execute a correction program stored in the memory when at least one of the longitudinal indicia displacement and the lateral indicia displacement exceeds a predetermined tolerance threshold.

2. The converting machine according to claim 1, wherein the control unit is configured to issue an error signal if a lateral indicia displacement exceeds a lateral tolerance threshold.

3. The converting machine according to claim 2, wherein the error signal is configured to activate an ejector module to eject the sheet if the lateral indicia displacement exceeds the lateral tolerance threshold.

4. The converting machine according to claim 2, wherein an operation of a feeder module is suspended upon the detection of at least one sheet having a lateral indicia displacement exceeding the lateral tolerance threshold.

5. The converting machine according to claim 1, wherein the calibration system further comprises:

a feed sensor configured to detect the position of a front leading edge of the sheet, wherein the control unit is further configured to calculate a feeding register displacement by comparing a measured position of the front leading edge with an optimal register position, and wherein the control unit is further configured to calculate an initial total longitudinal displacement corresponding to a sum of the longitudinal indicia displacement and the feeding register displacement.

6. The converting machine according to claim 5, wherein the calibration system further comprises a plurality of transfer sensors arranged along the travel path in the direction of conveyance and configured to detect register displacements.

7. The converting machine according to claim 5, wherein the operation of the transfer drives is modified if the initial total longitudinal displacement exceeds the longitudinal tolerance threshold, and wherein the longitudinal position of the sheet is corrected by modifying a speed of the transfer units.

8. The converting machine according to claim 7, wherein the control unit is configured to only modify the operation of the transfer drives if the initial total longitudinal displacement is lower than a maximum longitudinal correction limit.

9. The converting machine according to claim 8, wherein the correction program is configured to suspend a feeder module if the initial total longitudinal displacement is higher than the maximum longitudinal correction limit, and only reactivate the feeder module when an angular position of the rotary die-cutting tool has been modified.

10. The converting machine according to claim 1, wherein a housing of a transfer unit comprises a reference mark, preferably provided as a line and extending in a direction of conveyance of the converting machine, and wherein the reference mark is visually detectable by the image sensor.

11. The converting machine according to claim 5, wherein the control unit is configured to calculate an initial correction which is the sum of the longitudinal indicia displacement and the feeding register displacement, and wherein the control unit is further configured to calculate a plurality of fractional corrections such that the initial correction is equally distributed over the plurality of transfer units.

12. The converting machine according to claim 11, wherein the calibration system comprises a plurality of transfer sensors arranged along the travel path in the direction of conveyance and configured to detect register displacements, and wherein each register displacement detected by a transfer sensor is added to each subsequent fractional correction.

13. The converting machine according to claim 12, wherein the memory comprises instructions for the control unit in a first operating mode and in a second operating mode, wherein the control unit in the first operating mode is configured to disable the image sensor and only provide a correction of each register displacement detected by each transfer sensor and wherein each respective correction is only effectuated in each respective closest downstream-located transfer located between the transfer sensor and a closest downstream-located printing unit, and wherein the control unit in the second operating mode is configured to activate the image sensor and provide a plurality of distributed fractional corrections.

14. The converting machine according to claim 13, wherein the memory comprises a transitional memory and comprises a plurality of data positions for a plurality of sheets present in the converting machine, and wherein each data position contains positional information on the location of the sheet and a required fractional correction in the longitudinal direction.

15. A method of calibrating a converting machine, the method comprising the steps of:

A) transporting a sheet along a direction of conveyance through the converting machine according to claim 1, B) capturing an actual image of an indicia on said sheet, C) determining a lateral coordinate and a longitudinal coordinate of a detected reference point in the indicia, D) retrieving a lateral coordinate and a longitudinal coordinate of an optimal position of a predetermined reference point from a memory, E) calculating a deviation comprising a longitudinal indicia displacement and a lateral indicia displacement from the position of the detected reference point in relation to the optimal position of the predetermined reference point, and F) initiating a correction program when at least one of the longitudinal indicia displacement and the lateral indicia displacement exceeds a predetermined tolerance threshold.

16. The method according to claim 15, wherein the operation of the transfer drives is modified if an initial total longitudinal indicia displacement exceeds a longitudinal tolerance threshold, and wherein the position of the sheet is corrected by modifying a speed of the transfer drives.

17. The method according to claim 15, wherein a step of selecting a mode of operation between a first operating mode and a second operating mode is performed before the step A), wherein the method in the first operating mode excludes steps B) to F), and wherein the method instead comprises the steps of:

printing the sheet, detecting register displacements by a plurality of transfer sensors, and correcting each register displacement between each respective transfer sensor and each closest downstream-located printing unit, and wherein the method in the second operating mode only includes all steps A) to F).

* * * * *